United States Patent [19]

Gray

[11] Patent Number: 4,745,811

[45] Date of Patent: May 24, 1988

[54] PRESSURE MONITORING APPARATUS HAVING A HALL-EFFECT DETECTOR

[75] Inventor: Tommy L. Gray, Dallas, Tex.

[73] Assignee: Span Instruments, Inc., Plano, Tex.

[21] Appl. No.: 792,150

[22] Filed: Oct. 28, 1985

[51] Int. Cl.⁴ ............... G01L 7/04; G01L 9/14; G01L 19/04

[52] U.S. Cl. ............... 73/708; 73/735; 338/32 H

[58] Field of Search ............... 73/733, 734, 735, 708, 73/741, DIG. 3; 340/58, 688; 338/32 H

[56] References Cited

U.S. PATENT DOCUMENTS

| | | | |
|---|---|---|---|
| 1,887,804 | 11/1932 | Faber | 73/736 |
| 3,267,734 | 8/1966 | Marks | 73/734 |
| 3,691,843 | 9/1972 | Gorgens et al. | 73/733 |
| 3,863,067 | 1/1975 | Gooley | 250/231 R |
| 4,184,377 | 1/1980 | Hubbard | 73/733 |
| 4,192,193 | 3/1980 | Schnell | 73/739 |
| 4,275,393 | 6/1981 | Johnston | 340/688 |
| 4,342,230 | 8/1983 | Okamura et al. | 73/702 |
| 4,418,288 | 11/1983 | Imai et al. | 340/672 |
| 4,485,442 | 11/1984 | Snaper | 250/336.1 |
| 4,487,074 | 12/1984 | Herden | 73/708 |
| 4,502,334 | 3/1985 | Gorgens et al. | 73/733 |
| 4,529,961 | 7/1985 | Nishimura et al. | 340/58 |
| 4,667,514 | 5/1987 | Baer | 73/735 |

Primary Examiner—Donald O. Woodiel
Attorney, Agent, or Firm—Harold E. Meier

[57] ABSTRACT

A pressure responsive apparatus having a Hall-effect detector is described. The apparatus preferably includes a pressure gauge having a Bourdon tube responsive to an external pressure. The Bourdon tube has mounted thereto a pair of magnets supported on, or attached to, an end thereof for generating a low power, magnetic flux field. The Hall-effect detector is mounted in proximity to the pair of magnets and generates an output voltage having values corresponding to movement of the magnets with respect to the detector. A processing circuit receives the output voltage from the Hall-effect detector, and in response thereto generates a plurality of output signals proportional to the sensed pressure variations in the Bourdon tube.

16 Claims, 2 Drawing Sheets

PRESSURE MONITORING APPARATUS HAVING A HALL-EFFECT DETECTOR

TECHNICAL FIELD

This invention relates to condition responsive devices and, more particularly, to a pressure monitoring apparatus which incorporates a hall-effect detector and associated electronic circuitry for generating voltage and current outputs proportional to measured pressure variations.

BACKGROUND OF THE INVENTION

Condition responsive devices which provide an indication or control an operation in response thereto, are well-known in the prior art. Such devices have been used in many diverse environments. For example, it is known in the prior art to connect a pressure sensitive element, such as a Bourdon tube, to a source of external pressure, whereby in operation the tube is deflected by an amount proportional to sensed pressure variations. The mechanical deflection of the Bourdon tube is transduced into a mechanical or electrical output to provide an indication of the pressure in the tube or, alternatively, to control some other physical operation. An apparatus of this type is shown in U.S. Pat. No. 4,502,334 and in copending application Ser. No. 656,490 to Gray, filed Oct. 1, 1984.

Although such condition responsive devices have proved generally effective for indicating a condition or controlling an operation in response to a change in the condition, such devices may not be capable of providing the necessary degree of precision required in certain applications. For example, when a vane or other mechanical trigger device is attached to a Bourdon tube to facilitate the pressure measurement, this element increases the overall mass and friction of the Bourdon tube, thereby introducing error components into the output signal generated by the device. In precision applications, even a small degree of error in the output signal representative of the measured pressure can cause significant problems during the control process. Compensation for these error components often requires complex feedback control systems or circuits which increase the cost of the device and decrease reliability.

Accordingly, an advantage of the present invention is to provide a condition responsive apparatus having detection means associated with the pressure sensitive element which has only a minimum influence or otherwise affect the signal generated by the device.

SUMMARY OF THE INVENTION

The present invention relates generally to an apparatus having a control member movable in response to a predetermined physical condition. In the preferred embodiment, the control member is a pressure sensitive element, such a Bourdon tube, which expands in response to an externally-applied pressure. To facilitate use of the apparatus in precision applications, the present invention includes magnets attached to the control member and associated electronic circuitry for generating output signals having values corresponding to the sensed pressure in the pressure sensitive element.

According to the preferred embodiment of the invention, a pair of magnets are supported by, or attached to, an end of the Bourdon tube for movement therewith in response to pressure variations. These magnets create a low power, static magnetic flux field in the vicinity of a Hall-effect detector mounted on the apparatus in close proximity to the magnets. In operation, the Hall-effect detector generates an output signal having a value corresponding to the degree of movement of the magnets with reference to the Hall-effect detector. The apparatus also includes electronic circuitry for receiving the output signal from the Hall-effect detector, which in response thereto generates an output voltage and/or current output signals having values corresponding to the sensed pressure variations.

Accordingly, the condition responsive apparatus of the present invention overcomes several disadvantages associated with similar devices heretofore available; particularly, the failure of such devices to provide highly sensitive and accurate electrical output signals responsive to a sensed physical condition. In the present invention, such operation is provided by means of a Hall-effect detector response to movement of magnets mounted on the Bourdon tube, and associated signal processing circuitry for generating a plurality of conditioned output signals having values corresponding to detected pressure variations.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
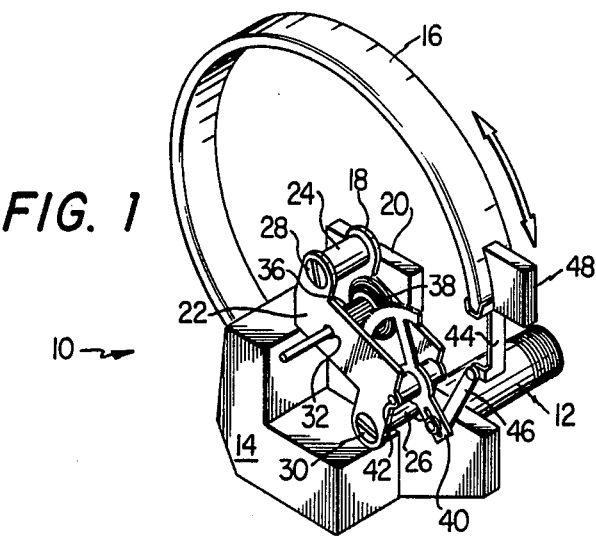
FIG. 1 is a perspective view of a prior Bourdon tube pressure gauge having a vane attached thereto for controlling a condition responsive apparatus.

Referring now to the drawings wherein like reference characters designate like or similar parts throughout the several views, FIG. 1 is a perspective view of a pressure gauge 10 of a condition responsive apparatus described in detail in copending application Ser. No. 656,490, filed Oct. 1, 1984, and assigned to the assignee of the present invention. The pressure gauge 10 includes a conduit 12, as partially show in the rear thereof, attached to a mounting block 14. The conduit 12 communicates with a well-known Bourdon pressure tube 16. Specifically, internal passages (not shown) within the mounting block 14 connect the conduit 12 to the Bourdon tube 16.

A holding bracket 18 is attached to an extension support 20 of the mounting block 14. A holding bracket 22 is mounted parallel to the holding bracket 18 and spaced therefrom by spacers 24 and 26. The holding bracket 22 is held in place by screws 28 and 30 which are threadedly engaged with the holding bracket 18. An output shaft 32 is supported by the holding brackets 18 and 22 and extends through the holding bracket 22 to support an indicating pointer (not shown) in accordance with well known construction. A pinion gear 36 and a spring 38 are attached the shaft 32 between the holding brackets 18 and 22.

As also seen in FIG. 1, a sector 40 is pivoted on a shaft 42 with the teeth of the sector engaging the teeth of the pinion gear 36. Shaft 42 is also held in place by the holding brackets 18 and 22. An attaching bracket 44 has one end thereof connected to the free end of the Bourdon tube 16 and the other end thereof connected to one end of a link 46. The other end of the link 46 is connected to the leverage end of the sector 40. The above structure forms a conventional Bourdon tube pressure gauge.

As more particularly described in the copending application Ser. No. 656,490, filed Oct. 1, 1984, the Bourdon tube 16 includes a vane 48 secured thereto for controlling a optical detector device (not shown). In particular, the vane 48 is preferably secured to the Bourdon tube 16 where the end of the attaching bracket 44 connects to the free end of the tube.

In operation, when the pressure within the conduit 12 increases or decreases, a corresponding increase or decrease within the Bourdon tube 16 occurs. For example, as the pressure increases within the Bourdon 16, the arc thereof increases, thus rotating the sector 40. As the sector 40 rotates, the teeth thereof engage with the pinion gear 36, thus translating the pivoting motion to the shaft 32 to rotate an indicating pointer or the like. Conversely, when the pressure within the tube 16 decreases, the arc thereof decreases, thus pivoting the sector 40 in the opposite direction and rotating the shaft 32 in a counterclockwise direction.

The pressure gauge 10 of FIG. 1 provides indications of sensed pressure variations. In certain precision applications, however, the use of the vane 48 attached to the Bourdon tube 16 tends to increase the likelihood that the signal output from the device may include error components due to the use of optical devices responsive to movement of the vane. Such error components are undesirable where the pressure gauge is required to provide a accurate pressure indications and output voltages for precision control applications.

Figure 2:
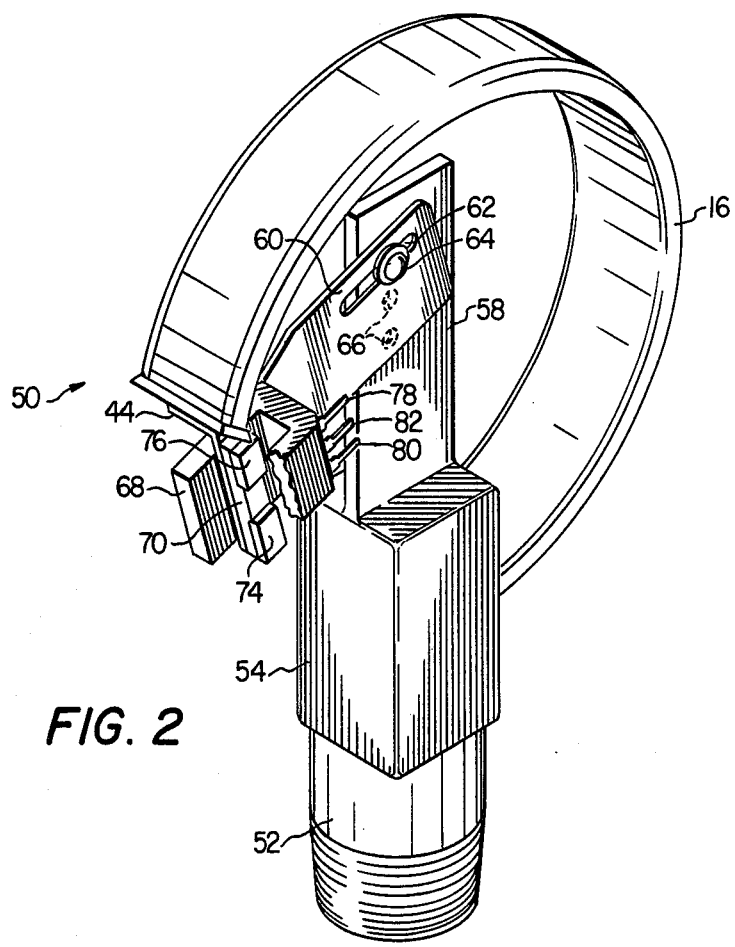
FIG. 2 is a perspective view of a Bourdon tube pressure gauge according to the present invention having a Hall-effect detector, (shown partially cutaway) for generating an output signal having values corresponding to sensed pressure variations.

With reference now to FIG. 2, a pressure gauge 50 is shown which provides improved performance as compared to the pressure gauge 10 of FIG. 1. For purposes of illustration only, the pressure gauge 50 includes a conduit 52, attached to a mounting block 54. The conduit 52 may either extend from the bottom of the pressure gauge as shown in FIG. 2 or from the rear of the gauge as shown in FIG. 1. The conduit 52 communicates with the Bourdon tube 16. Specifically, internal passages (not shown) within the mounting block 54 connect the conduit 52 to the Bourdon tube 16. The gauge 50 would also include the various mechanical elements described above including the bracket 44 with respect to FIG. 1 for driving a pointer to provide a visual pressure indication.

As also shown in FIG. 2, a holding bracket 58 is attached to the mounting block 54 and supports a detector bracket 60. Detector bracket 60 includes a slot 62 through which a screw 64 is threaded into the holding bracket 58. The holding bracket 58 includes a number of holes 66, shown in phantom, for receiving the screw 66 and therefore adjusting the position of the detector bracket 60 with respect to the holding bracket 58.

According to a feature of the present invention, the detector bracket 60 supports a Hall-effect detector 68. Detector 68 generates an output signal proportional to applied pressure in the Bourdon tube 56. To this end, the Bourdon tube 56 includes a magnet mount assembly 70 attached to the bracket 44, which assembly supports magnets 74 and 76. Preferably, the magnets 74 and 76 are formed of a rare earth material such as Ytterbium or Cerium, and serve to generate a low power, static magnetic flux field in the vicinity of the Hall-effect detector 68.

In operation of the pressure gauge 50 of FIG. 2, when the pressure within the conduit 52 increases or decreases, a corresponding increase or decrease of pressure within the Bourdon tube 16 occurs. As the pressure increases within the Bourdon tube 16, the arc thereof increases, thus moving the magnets 74 and 76 and as a result the surrounding magnetic field with reference to the Hall-effect detector 68. Conversely, when the pressure within the bourdon tube 56 decreases, the arc thereof decreases, thus rotating the magnets 74 and 76 with reference to the detector 68. Such deflections of the Bourdon tube 56 cause the Hall-effect detector 68 to generate an output signal having a value corresponding to the position of the magnetic flux field created as the magnets 74 and 76 move with respect to the detector 68.

As also shown in FIG. 2, the Hall-effect detector 68 includes positive and negative connector terminals 78 and 80 for receiving a supply voltage for driving the device. The signal generated by the detector 68 is output via the connector terminal 82.

The pressure gauge 50 of FIG. 2 overcomes several problems associated with prior devices incorporating a vane element on the Bourdon tube. In particular, such devices have difficulty producing a precision output signal proportional to the sensed pressure variations because the vane tends to add additional weight and friction to the Bourdon tube, thereby producing error components in the output signal. The present invention overcomes these and other problems of such previous devices through use of the relatively lightweight magnets 74 and 76 supported to move in proximity to the Hall-effect detector 68. This structure provides no appreciable increase in the weight or friction of the Bourdon tube 56, and has been found to provide improved performance as compared to previously known devices.

Figure 3:
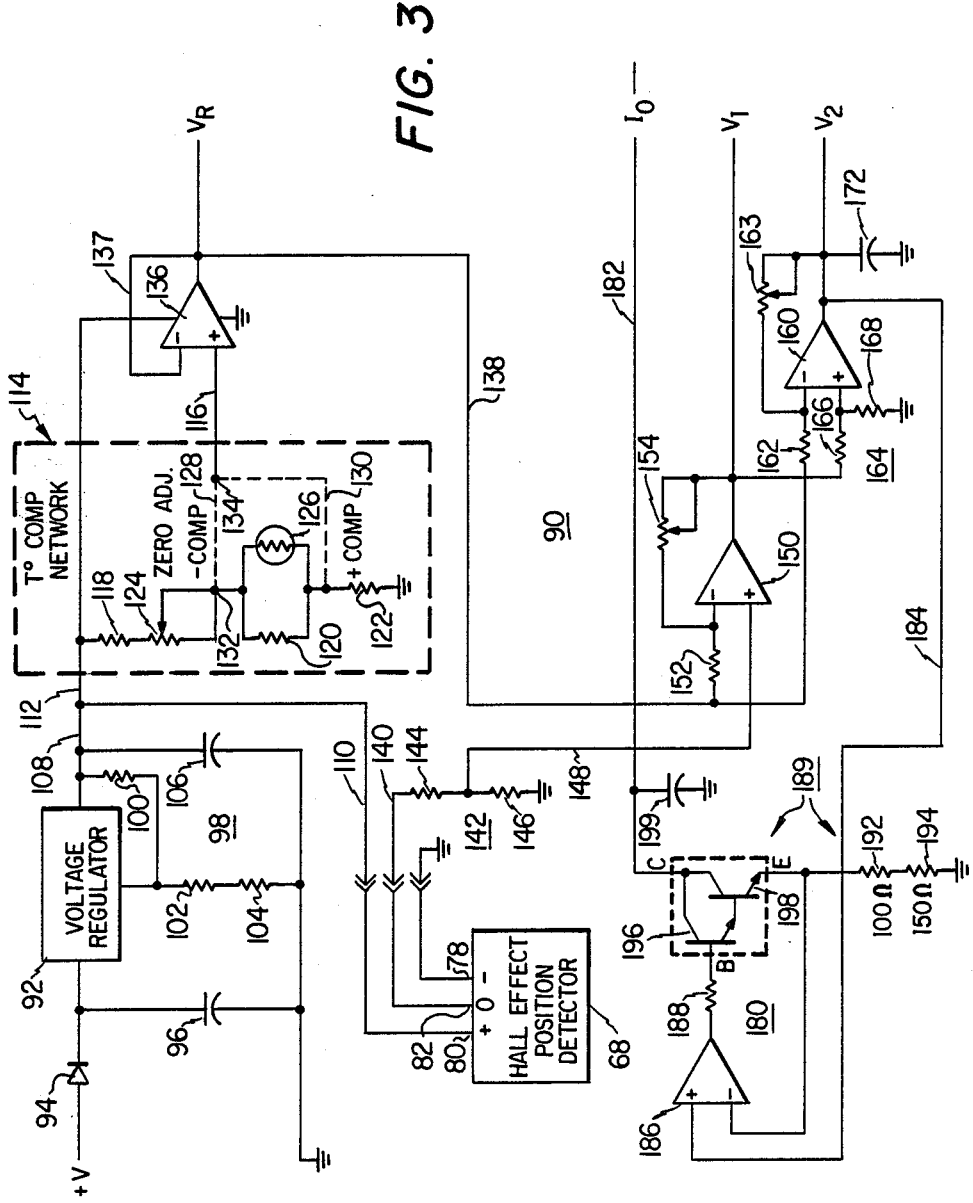
FIG. 3 is a schematic diagram of an electronic circuit for use with the Bourdon tube pressure gauge of FIG. 2.

With reference now to FIG. 3, a schematic diagram is shown of a preferred electronic signal processing circuit 90 for use with the Hall-effect detector 68 of FIG. 2. Generally, in operation the processing circuit 90 receives the signal from the Hall-effect detector 68, and in response thereto generates a plurality of voltage and current output signals having values corresponding to sensed pressure variations in the Bourdon tube 16. An advantage of the circuit of FIG. 3 that provides multiple outputs is that there results a pressure responsive device having general application to various control and monitoring systems.

Referring specifically to FIG. 3, the electronic signal processing circuit 90 includes a conventional voltage regulator 92 connected between a source of positive supply voltage and ground. The supply voltage is applied to the voltage regulator 92 through a circuit comprising a diode 94 and a capacitor 96. A resistor/capacitor network 98, including resistors 100, 102 and 104, and capacitor 106, provides a smoothing function to the output of the voltage regulator 92. The regulated supply voltage generated on conductor 108 is applied via conductor 110 to terminal 80 of the Hall-effect detector 68, and via conductor 112 to a temperature compensation network 114.

The temperature compensation network 114 includes trimming resistors 118, 120 and 122, a zero adjust resistor 124, and a temperature sensitive element 126. In operation, an output conductor 116 of the temperature compensation network 114 is connected for positive or negative temperature compensation depending on which of the lines 128 or 130 is connected to the node 134.

The conductor 116 is connected to the non-inverting input of an operational amplifier 136, the output of which is connected to the inverting input thereto via a feedback connection 137. The output of the operational amplifier 136, designated $V_R$, forms a temperature-compensated reference voltage which is used in the remainder of the processing circuit 90.

The zero adjust resistor 124 sets the output voltage $V_R$ when zero pressure is applied to the gauge 50. $V_R$ is calibrated to 0 volts if a 0–5.0 volt output range is utilized, and to 1 volt if a 1–5.0 volt output range is used.

As discussed above with respect to FIG. 2, the Hall-effect detector 68 generates an output at terminal 82 having a value corresponding to the degree of movement of the magnets 74 and 76, such movement representing a pressure increase or decrease in the Bourdon tube 16. Referring back to FIG. 3, the signal output from the Hall-effect detector 68 is applied via line 140 to a voltage divider 142 comprising resistors 144 and 146. The output of the voltage divider 142 is applied via conductor 148 to a non-inverting input of an operational amplifier 150. The inverting input to the amplifier 150 receives the temperature-compensated reference voltage $V_R$ applied via conductor 138 through a resistor 152. The output of the amplifier 150 is also applied to the inverting input thereto through a gain adjust feedback resistor 154. In operation, the amplifier 150 compares the temperature-compensated reference voltage $V_R$ and the signal output from the Hall-effect detector 68, and in response thereto generates an output voltage, designated $V_1$, proportional to the sensed pressure variations in the Bourdon tube 16.

The gain adjust feedback resistor 154 sets the output voltage $V_1$ when full scale pressure is applied to the pressure gauge 50 during calibration. Moreover, because the amplifier 150 compares the detector output with the reference voltage $V_R$, the output voltage $V_1$ floats with the voltage determined by the setting of the zero adjust resistor 124.

As seen in FIG. 3, the processing circuit 90 also includes operational amplifier 160 whose inverting input receives the temperature-compensated reference voltage $V_R$ applied via conductor 138 through resistor 162. The inverting input of the amplifier 160 also includes a gain setting resistor 163 connected in a feedback loop. Amplifier 160 receives the output $V_1$ of amplifier 150 at its non-inverting input via a voltage divider 164 comprising resistors 166 and 168. In operation, the amplifier 160 compares the temperature-compensated reference voltage $V_R$ and the output voltage $V_1$ from the amplifier 150, and in response thereto generates a ground-referenced output voltage, designated $V_2$, proportional to the sensed pressure variations in the Bourdon tube. The output $V_2$ of the amplifier 160 is coupled from the circuit 90 by means of a capacitor 172.

According to another feature of the invention, the processing circuit 90 of FIG. 3 includes circuitry for generating a current output proportional to sensed pressure variations in the Bourdon tube. Current outputs are frequently used in process control systems where the control devices are located some distance from the processing equipment, and where long conductors can become electrically "noisy" from magnetic or radio frequency interference. To this end, a voltage-to-current conversion circuit, designated generally by the reference numeral 180, is provided for comparing an externally applied voltage on conductor 182 with the output voltage $V_2$ applied to circuit 180 via conductor 184. The voltage-to-current conversion circuit 180 functions to generate a current on conductor 182 proportional to the sensed pressure variations in the Bourdon tube 16 of FIG. 2.

The voltage-to-current conversion circuit 180 includes an operational amplifier 186, whose non-inverting input receives the output voltage $V_2$ via conductor 184. The output of the amplifier 186 is applied through a resistor 188 to a current sinking circuit 189 comprising Darlington amplifier 190 and series-connected reference resistors 192 and 194. The Darlington amplifier 190 comprises transistors 196 and 198, and includes a collector terminal C connected to a capacitor 199 and to conductor 182, and a base terminal B connected to receive the output of amplifier 186 through an input resistor 188. The Darlington amplifier 190 also includes an emitter E connected to the inverting input of the amplifier 186, and also to the pair of reference resistors 192 and 194.

In operation, the voltage-to-current conversion circuit 180 monitors the ground referenced output voltage $V_2$ from the amplifier 160, and regulates the external by applied voltage on the conductor 182 to exactly this voltage. The circuit 180 then applies the regulated voltage to the reference resistors 192 and 194. In the preferred embodiment, resistor 192 is approximately 100 ohms and resistor 194 is approximately 150 ohms. As 1.0 volt through 250 ohms is equal to 4 ma, and 5.0 volts through 250 ohms is equal to 20 ma, operation of the voltage-to-current conversion circuit 180 generates an output current $I_0$ that varies in the range of 4–20 ma on the conductor 182. Specifically, the reference resistors 192 and 194 establishes a current in the line 182 that varies in exact proportion to the output voltage $V_2$ on line 168, thereby generating a current proportional to sensed pressure variations in the Bourdon tube.

The electronic processing circuit 90 of FIG. 3 thus receives the output voltage from the Hall-effect detector 68 of FIG. 2 and in response thereto generates a plurality of output signals proportional to the sensed pressure variations in the Bourdon tube. Specifically, amplifiers 150 and 160 generate output voltages $V_1$ and $V_2$, respectively, and voltage-to-current conversion circuit 180 provides a current sink output $I_0$ on conductor 182, proportional to these pressure variations.

Moreover, the use of the small, low power, light weight magnets 74 and 76 in conjunction with the Hall-effect detector 68 of FIG. 2 advantageously provides a sensitive magnetic flux field detector which results in a relatively precise output voltage at the output of the detector 68. As discussed above, this voltage is then processed by the processing circuit 90 as shown in FIG. 3 to provide a plurality of conditioned outputs from the device.

It should be appreciated that although the above description has been directed to a condition responsive apparatus including a Bourdon tube pressure gauge, this description is not meant to be limiting. It is envisioned that the Hall-effect detector of FIG. 2, and its associated processing circuitry of FIG. 3, can be used in many condition responsive devices having a control member movable in response to a predetermined physical condition.

Although the invention has been described in detail, it is to be clearly understood that the same is by way of illustration and example only and is not to be taken by way of limitation, the spirit and scope of the invention being limited only to the terms of the appended claims.

I claim:

1. A condition responsive apparatus, comprising:
   a control member movable in response to variations in a physical condition;
   magnetic means supported by said control member for movement therewith in response to said variations in the physical condition;
   a Hall-effect detector mounted in proximity to said magnetic means for generating a signal proportional to movement of said magnetic means with respect to said detector; and
   signal processing means including means for generating a temperature-compensating reference voltage, said processing means receiving the signal from said Hall-effect detector and the generated temperature compensated reference voltage and in response thereto generating at least one of the outputs, a floating voltage output, a ground referenced voltage output or a current output, each output proportional to variations in the external pressure.

2. A condition responsive apparatus, comprising:
   a Bourdon tube having a free end movable in response to variations in an external pressure;
   magnetic means mounted to the free end of said Bourdon tube for movement therewith in response to said variations in the external pressure;
   a Hall-effect detector mounted in proximity to said magnetic means for generating a signal proportional to movement of said magnetic means with respect to said detector; and
   signal processing means for receiving the signal from said Hall-effect detector and in response thereto generating at least one of the following outputs, a floating voltage output, a ground referenced voltage output, or a current output, each output varying proportional to variations in the external pressure.

3. The condition responsive apparatus as described in claim 2 wherein said magnetic means includes a pair of magnets for generating a low power, magnetic flux field proximate said Hall-effect detector.

4. A pressure responsive apparatus, comprising:
   a pressure gauge having a Bourdon tube including a free end responsive to variations in an external pressure;
   magnetic means mounted to the free end of said Bourdon tube for movement therewith in response to said variations in the external pressure;
   a Hall-effect detector mounted in proximity to said magnetic means for generating a signal varying in accordance with movement of said magnetic means with respect to said detector; and
   signal processing means for receiving said signal from said detector and in response thereto generating at least one of the following outputs, a floating voltage output, a ground referenced voltage output, or a current output, each output proportional to variations in the external pressure.

5. A condition responsive apparatus, comprising:
   a control member movable in response to variations in a physical condition;
   magnetic means supported by said control member for movement therewith in response to variations in the physical condition;
   a Hall-effect detector mounted in proximity to said magnetic means for generating a signal proportional to movement of said magnetic means with respect to said detector; and
   signal processing means including means for generating a temperature compensating reference voltage and means for comparing said temperature compensated reference voltage with the signal from said detector, and in response thereto generating at least one of the following outputs, a floating voltage output, a ground referenced voltage output, or a current output, each output proportional to variations in the physical condition.

6. The condition responsive apparatus as described in claim 5 wherein said signal processing means further includes means for comparing said temperature-compensated reference voltage with said floating voltage output, and in response thereto generating the ground referenced output voltage $V_2$ proportional to variations in the physical condition.

7. The condition responsive apparatus as described in claim 6 wherein said signal processing means further includes voltage-to-current conversion means for comparing an externally applied voltage and said ground referenced output voltage, and in response thereto generating the current output that varies proportional to variations in the physical condition.

8. The condition responsive apparatus as described in claim 7 wherein said voltage-to-current conversion means includes a comparator for receiving said external voltage and said ground referenced output voltage, and a current circuit to said comparator and having a pair of current resistors, wherein said current sinking resistors establishes a current in proportion to said ground referenced output voltage to generate said current output.

9. A pressure responsive apparatus, comprising:
   a pressure gauge having a Bourdon tube responsive to variations in an external pressure;
   a support assembly attached to said Bourdon tube for movement therewith in response to said variations in the external pressure;
   a pair of magnets supported on said support assembly for generating a low power, magnetic flux field;
   a Hall-effect detector mounted in proximity to said pair of magnets for generating a voltage having values corresponding to the movement of the pair of magnets with respect to said detector; and
   a processing circuit for receiving said voltage from said Hall-effect detector and in response thereto generating a floating output voltage, a ground referenced output voltage and a current output proportional to variations in the external pressure.

10. The pressure responsive apparatus as described in claim 9 wherein said processing circuit includes:
    a temperature compensation network for receiving a regulated supply voltage and in response thereto generating a temperature-compensated reference voltage; and
    a comparator for comparing the voltage from said detector with the temperature-compensated reference voltage, and in response thereto generating the floating output voltage.

11. The pressure responsive apparatus as described in claim 10 wherein said processing circuit further includes:
    a comparator for comparing the temperature-compensated reference voltage with the floating output voltage, and in response thereto generating the ground-referenced output voltage.

12. The pressure responsive apparatus as described in claim 11 wherein said processing circuit further includes:
a voltage-to-current converter for comparing an externally applied voltage with the ground-referenced output voltage, and in response thereto generating the current output.

13. A pressure responsive apparatus, comprising:
a pressure gauge having a Bourdon tube responsive to variations in an external pressure;
a pair of magnets attached to said Bourdon tube for movement therewith in response to variations in the external pressure;
a Hall-effect detector mounted in proximity to said pair of magnets for generating a voltage having values corresponding to movement of the pair of magnets with respect to said detector; and
a processing circuit, comprising:
  means for generating a temperature-compensated reference voltage;
  means for comparing the voltage from said Hall-effect detector with the temperature-compensated reference voltage, and in response thereto generating a first output voltage;
  means for comparing the temperature-compensated reference voltage with the first output voltage, and in response thereto generating a second output voltage; and
  means for comparing an externally applied voltage and the second output voltage, and in response thereto generating an output current;
  wherein the first and second output voltages and the output current are proportional to the variations in the external pressure applied to said Bourdon tube.

14. The condition responsive apparatus as described in claim 13 wherein each of said magnets is formed of a rare earth material.

15. The pressure responsive apparatus as described in claim 13 wherein said means for generating a temperature-compensated reference voltage comprises a temperature compensation network including a temperature sensitive element and zero adjust resistor means for setting the reference voltage when zero pressure is applied to said pressure gauge.

16. The pressure responsive apparatus as described in claim 13 wherein said means for comparing the voltage from said detector with the temperature-compensated reference voltage includes a comparator having gain adjustment means for setting the first output voltage when full scale pressure is applied to said pressure gauge.

* * * * *